(12) United States Patent
Tso

(10) Patent No.: US 7,743,271 B2
(45) Date of Patent: Jun. 22, 2010

(54) USE OF A UUID AS A TIME EPOCH TO DETERMINE IF THE SYSTEM CLOCK HAS BEEN RESET BACKWARDS IN TIME

(75) Inventor: Theodore Y. Tso, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 649 days.

(21) Appl. No.: 11/679,303

(22) Filed: Feb. 27, 2007

(65) Prior Publication Data

US 2008/0209249 A1 Aug. 28, 2008

(51) Int. Cl.
G06F 1/26 (2006.01)
(52) U.S. Cl. ........................................ 713/500; 713/502
(58) Field of Classification Search .................. 713/500
See application file for complete search history.

(56) References Cited

U.S. PATENT DOCUMENTS

| | | | | |
|---|---|---|---|---|
| 5,117,351 A * | 5/1992 | Miller | ........................... | 707/10 |
| 5,870,753 A | 2/1999 | Chang et al. | ............. | 707/103 R |
| 5,913,217 A * | 6/1999 | Alger et al. | .................. | 707/101 |
| 6,003,066 A | 12/1999 | Ryan et al. | ................... | 709/201 |
| 6,104,810 A * | 8/2000 | DeBellis et al. | ............... | 380/43 |
| 6,542,907 B1 * | 4/2003 | Cohen | ......................... | 707/203 |
| 6,987,853 B2 * | 1/2006 | Uner | ............................ | 380/44 |
| 2002/0161994 A1 | 10/2002 | Cromer et al. | ................. | 713/2 |
| 2002/0184230 A1 | 12/2002 | Merrells et al. | ............. | 707/102 |
| 2005/0039068 A1 | 2/2005 | Bailey et al. | ................ | 713/600 |

OTHER PUBLICATIONS

The Open Group "Universal Unique Identifier" CDE 1.1: Remote Procedure Call 1997 (7 pages).
Compaq Computer Corporation, Dell Computer Corporation, Hewlett Packard Company, Intel Corporation, Microsoft Corporation "Network PC System Design Guidelines; A Reference for Designing Net PC Systems for Use with the Microsoft® Windows® and Windows NT® Operating Systems" Version 1.0b, Aug. 5, 1997 (152 pages).

* cited by examiner

*Primary Examiner*—Nitin C Patel
(74) *Attorney, Agent, or Firm*—Hamilton & Terrile, LLP; Michael Rocco Cannatti

(57) ABSTRACT

A method, system and program are provided for determining if a system clock has been reset backwards in time by using a randomly generated set of bytes (such as a randomly generated or type 4 UUID) as a time epoch. By generating a time epoch at boot time and whenever the system clock is set back in time, an application can compare the time epoch value at an earlier point in its execution, with the current time epoch. If the time epoch values are different, the application will know that the system clock has been set back in time.

20 Claims, 3 Drawing Sheets

USE OF A UUID AS A TIME EPOCH TO DETERMINE IF THE SYSTEM CLOCK HAS BEEN RESET BACKWARDS IN TIME

BACKGROUND OF THE INVENTION

1. Field of the Invention

The present invention is directed in general to the field of data processing systems. In one aspect, the present invention relates to system clock management within data processing systems.

2. Description of the Related Art

Data processing systems and the applications that run on them rely on timing devices, such as clocks, to operate. For example, a conventional processor contains a system clock that uses a quartz crystal to generate a constant flow of pulses to allow the processor to operate and that also provides a timing reference to all of the other hardware logic in a data processing system. A number of userspace libraries and/or applications use the system clock to generate timestamps that are used for synchronization, for calculating dependencies (such as make), for controlling system hardware (such as determining when a cache memory should be refreshed) or for generating unique and/or random identification values, such as Universally Unique Identifiers (UUIDs). However, there can be timestamp collisions in such applications if the system clock has been reset backwards, or if there is an indication that the timestamp may have be set backward (such as during reboot). An example of such a timestamp-based application is a type 1 UUID library application that generates a time-based universally unique identifier (UUID) using the MAC network address of the host, a timestamp, and a clock sequence counter. If the clock on the host is reset backwards in time, the UUID specification states that the clock sequence counter must be incremented to avoid generating previously-generated UUIDs. See, IETF Proposed Standard RFC 4122, entitled "A Universally Unique IDentifier (UUID) URN Namespace."

A variety of solutions have been proposed for dealing with a system clock setback event, but these solutions suffer from a number of drawbacks. For example, a sampling program can be run to monitor the system clock and detect any clock setback event, but because such sampling programs only work when they are active, they can not detect a clock setback event across system (re)boot events. Other systems (such as described in RFC 4122) propose to deal with clock setback events by including a clock sequence ID value in the timestamp that is incremented whenever the system clock is set backwards in time, but these systems do not provide a detection mechanism for determining if the system clock has been tampered with or set back in the first place. Other systems deal with the system clock setback problem by preventing a system clock setback from occurring at all. For example, the Multics (Multiplexed Information and Computing Service) operating system (OS) used the system clock to create unique IDs, but was configured to prevent the system clock from being reset backwards in time if the time was erroneously set into the far future and the system was booted. In other words, if the system clock was reset while the OS is not running, Multics refused to boot because of the possibility that the system might create a non-unique ID. To fix this situation, the entire Multics filesystem would have to be manually reviewed to find unique IDs that are in the future, and then these IDs would have to be reset to a safe value before manually resetting the system's concept of when the last time it was running, an unduly complex and time-consuming solution.

Accordingly, there is a need for a system and method of determining if the system clock has been set back in time. In addition, there is a need for an improved method, apparatus, and computer instructions for detecting system clock setback events across system boot events. There is also a need for a detection mechanism for determining if the system clock has been tampered with or set back. Further limitations and disadvantages of conventional clock management solutions will become apparent to one of skill in the art after reviewing the remainder of the present application with reference to the drawings and detailed description which follow.

SUMMARY OF THE INVENTION

A clock management system and methodology are provided for determining if a system clock has been reset backwards in time by generating clock-based random values over time and storing the random values in memory as a time epoch value, where each random value is generated at least in part from a hardware or cryptographic random number generator. As described herein, a first random value is a random UUID or type 4 UUID. The first random value can be generated during boot up, or when an application first attempts to read the time epoch value if the first random value has not already been generated and stored. By subsequently generating a second random value when the system clock is set back in time from a previous system clock setting, the time epoch value may be updated with by storing the second random value. In an example, embodiment, system clock setback events are detected in the context of a Linux operating system by using a time epoch module in the Linux kernel layer that is configured to detect a system clock setback event when the system clock is changed. By storing and updating the time epoch value in this way, the time epoch value can be checked over time by applications to determine from a change in the time epoch value that the system clock has been set back in time, as indicated when the first and second time epoch values are different. In an example implementation where an application (such as a type 1 UUID generator utility) needs to detect system clock setback events, the application can request a first copy of the time epoch value, and can subsequently request a second copy of the time epoch value for purposes of comparing the first and second copies of the time epoch value to determine whether the system clock is set back in time. If the comparison indicates that the time epoch value has changed over time, the application can resolve the clock setback event (e.g., by incrementing the clock sequence ID portion of a type 1 UUID).

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

A method, system and program are disclosed for generating a random value, such as a random or type 4 UUID, at boot time and whenever the system clock is set backward in time. The random value is generated with a random number generator, such as a hardware (sometimes called "true") random number generator or a cryptographic random number generator which has been seeded using some true (unpredictable) hardware randomness. By storing the random value, the random value serves as a time epoch indication of the system clock state at that point in time. At any subsequent point when the system clock is accessed by an application (such as when generating a timestamp or time code value, at a subsequent boot event or upon detection of a system clock setback event), a new random value (e.g., another UUID) is generated and compared to the original random value that is retrieved from memory. If the original and new random values are different, the application will know that the system clock has been set back in time.

Various illustrative embodiments of the present invention will now be described in detail with reference to the accompanying figures. It will be understood that the flowchart illustrations and/or block diagrams described herein can be implemented in whole or in part by dedicated hardware circuits, firmware and/or computer program instructions which are provided to a processor of a general purpose computer, special purpose computer, or other programmable data processing apparatus to produce a machine, such that the instructions (which execute via the processor of the computer or other programmable data processing apparatus) implement the functions/acts specified in the flowchart and/or block diagram block or blocks. In addition, while various details are set forth in the following description, it will be appreciated that the present invention may be practiced without these specific details, and that numerous implementation-specific decisions may be made to the invention described herein to achieve the device designer's specific goals, such as compliance with technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

Figure 1:
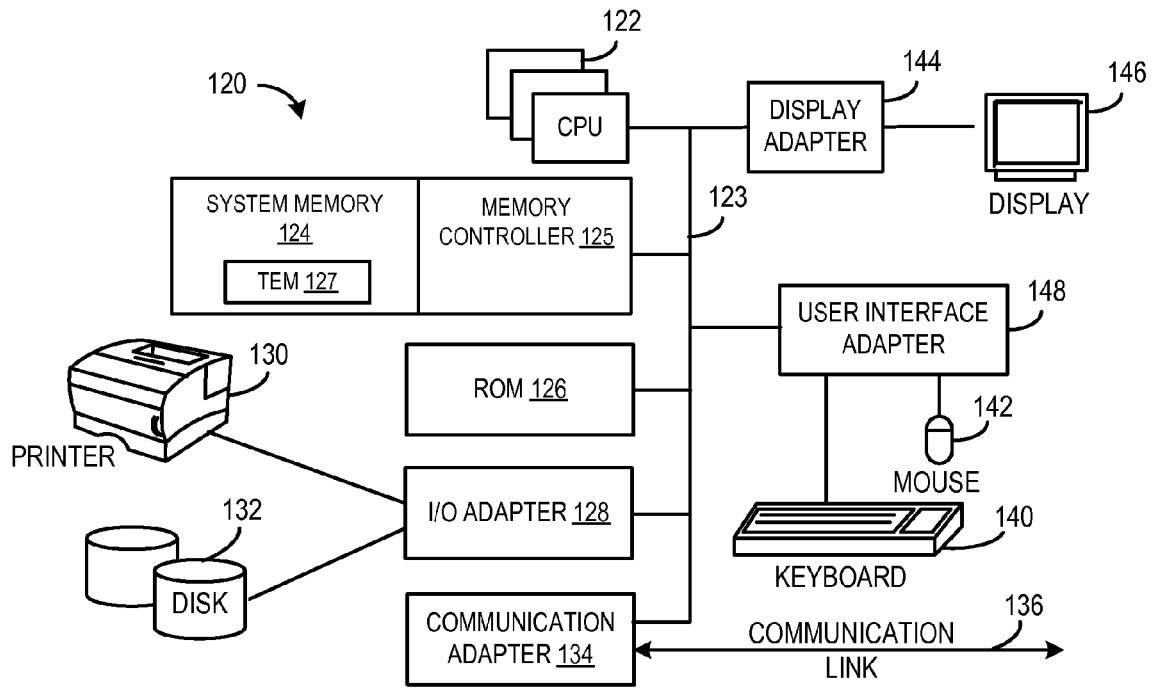
FIG. 1 illustrates a computer architecture that may be used within a data processing system in which the present invention may be implemented.

Referring to FIG. 1, an architecture of a data processing system 120 is diagrammatically depicted in which selected embodiments of the present invention may be implemented. The depicted data processing system 120 contains one or more central processing units (CPUs) 122, a system memory 124, and a system bus 123 that couples various system components, including the processing unit(s) 122 and the system memory 124.

System memory 124 may be implemented with computer storage media in the form of nonvolatile memory and/or volatile memory in the form of a collection of dynamic random access memory (DRAM) modules that store data and instructions that are immediately accessible to and/or presently operated on by the processing unit(s) 122. In an example implementation, the system memory 124 includes a time epoch module (TEM) 127 for implementing or controlling the generation and storage of a random value (such as a type 4 UUID) in memory at each boot event and whenever a system clock is set backwards in time. The TEM 127 may be implemented as part of the OS with kernel-level code, though it will be appreciated that the TEM 127 can be stored in any memory location, including other parts of the system memory 124, the ROM 126, or even in external memory (e.g., 132). In addition, the random value generated by the TEM 127 may be stored in nonvolatile memory as part of the TEM 127 or at any predetermined memory location that is controlled by the OS. System memory may also have an associated memory controller 125 for controlling access to and from system memory 124.

The depicted system bus 123 may be implemented as a local Peripheral Component Interconnect (PCI) bus, Accelerated Graphics Port (AGP) bus, Industry Standard Architecture (ISA) bus, or any other desired bus architecture. System bus 123 is connected to a communication adapter 134 that provides access to communication link 136, a user interface adapter 148 that connects various user devices (such as keyboard 140, mouse 142, or other devices not shown, such as a touch screen, stylus, or microphone), and a display adapter 144 that connects to a display 146. The system bus 123 also interconnects the system memory 124, read-only memory 126, and input/output adapter 128 which supports various I/O devices, such as printer 130, disk units 132, or other devices not shown, such as an audio output system, etc. The I/O adapter 128 may be implemented as a small computer system interface (SCSI) host bus adapter that provides a connection to other removable/non-removable, volatile/nonvolatile computer storage media, such as disk units 132 which may be implemented as a hard disk drive that reads from or writes to non-removable, nonvolatile magnetic media, a tape drive that reads from or writes to a tape drive system, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

As will be appreciated, the hardware used to implement the data processing system 120 can vary, depending on the system implementation. For example, hardware or peripheral devices, such as flash read-only memory (ROM), equivalent nonvolatile memory, or optical disk drives and the like, may be used in addition to or in place of the hardware depicted in FIG. 1. In addition to being able to be implemented on a variety of hardware platforms, the present invention may be implemented in a variety of software environments so that different operating systems (such as Linux, Microsoft, AIX, BSD, Mac OS, HP-UX and Java-based runtime environments) are used to execute different program applications (such as a word processing, graphics, video, or browser program). In other words, while different hardware and software components and architectures can be used to implement different data processing systems (such as a Web-enabled or network-enabled communication device or a fully featured desktop workstation), such hardware or architectural examples are not meant to imply limitations with respect to the system clock management techniques disclosed herein.

Figure 2:
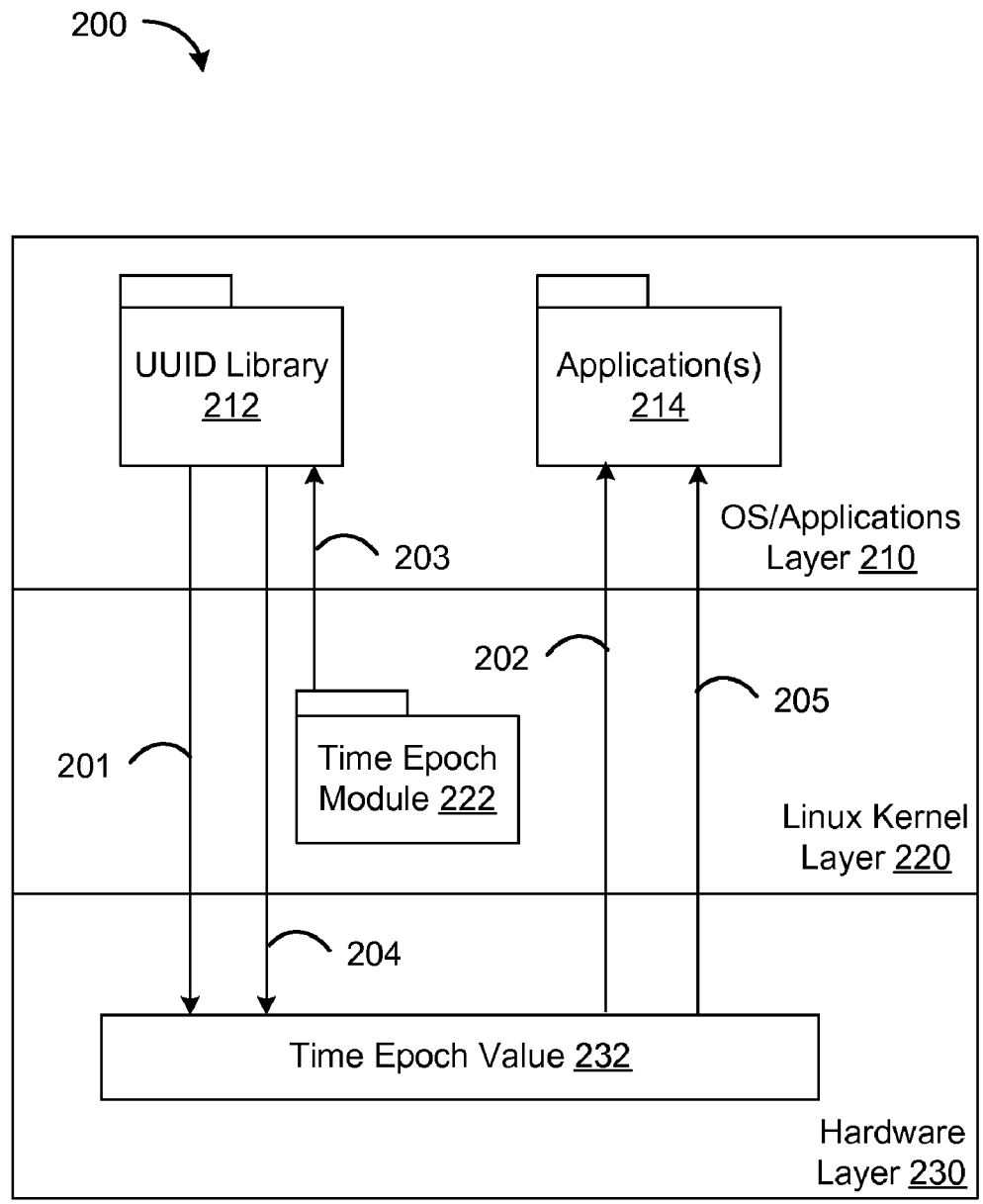
FIG. 2 depicts an example of a time epoch module that is used determine of the system clock has been reset backwards.

FIG. 2 depicts an example of a data processing system 200 in which a time epoch module 222 is used to determine whether the system clock has been set back in time. In the depicted example of a Linux OS implementation, the time epoch module 222 is implemented in the Linux kernel layer 220 which serves as an interface between the hardware layer 230 and the OS and applications layer 210. In turn, the OS and applications layer 210 resides above the kernel and hardware layers 220, 230, and is the basic environment for applications 214. Though a Linux OS implementation is illustrated, it will be appreciated that other types of operating systems and kernel layers may be used.

Each time the system 200 is booted, a first random value is generated to serve as a time epoch indication of the system clock state at that point in time. In accordance with an example embodiment, the random value is a random UUID that is generated by a UUID library 212 utility in the operating system layer 210, though other types of time-based UUIDs can be used. A random UUID (also referred to as a type 4 UUID) is typically 16-bytes (128-bits) long, and includes a random number portion of 122 random bits, a version portion of 4 bits used to identify the UUID version (e.g., "Randomly generated UUID"), and a variant portion of 2 bits used to identify the variant (e.g., "Leach-Salz"). The UUID Library utility 212 generates the random UUID from information including, but not limited to, the network address of the host system 200 and the current time. The current time may be obtained (e.g., from a system clock or external time source such as an atomic time server), and may be expressed as a binary value representing the time/date. To reduce the risk that the random number portion is duplicated between different random UUIDs, the random number portion of the random UUID is generated using a hardware (sometimes called "true") random number generator or a cryptographic random number generator which has been seeded using some true (unpredictable) hardware randomness. One drawback associated with using pseudo-random number generators (PRNG) is that there is no guarantee that UUIDs generated using a pseudo-random number generator could not repeat if the PRNG is seeded with the same value as had been used previously. In contrast, a hardware random number generator uses something truly unpredictable, such as the quantum noise generated by a noise diode, or the radioactive decay of some sample radioactive material. In addition, it will be appreciated that other types of Universally Unique Identifiers or random values can be used, so long as the method of generator them provides a guarantee of uniqueness similar to that of the UUIDs as specified in RFC 4122.

Once the random UUID value is generated by the UUID Library utility 212 (e.g., during boot up), the value is stored as the time epoch value 232 in a memory location that is controlled by the operating system, such as in nonvolatile memory at the hardware layer 230. For example, when implemented in a Linux operating system, the random value may be stored (as indicated at line 201) as a time epoch value in the Linux kernel random number file directory as /proc/sys/kernel/random/time_epoch. In this way, an application 214 can read the time epoch value 232 (as indicated at line 202) either by using a kernel system call (e.g., sysctl), or from the file directory location /proc/sys/kernel/random/time_epoch.

In accordance with selected embodiments of the present invention, the time epoch module 222 in the kernel layer 220 detects a system clock setback event in the system 200, and if a system clock setback event is detected, the time epoch module 222 commands the UUID library 212 (as indicated at line 203) to issue a new random UUID for storage as the time epoch value 232 (as indicated at line 204). While the specifics of how a system clock setback event is detected will vary from one operating system to another, in the example Linux implementation described herein, the time epoch module 222 may be configured to detect a system clock setback event when the system clock is changed using the settimeofday(2) or clock_settime(CLOCK_REALTIME) commands to a new time that is less than the current time. In addition or in the alternative, the time epoch module 222 may be configured to detect a system clock setback event when the system's timezone value is initially set a boot time, and the tz_minuteswest data field is a negative number (since this will warp time backwards).

With this configuration, an application 214 can determine if the system clock has been reset backwards by comparing the time epoch values over time. For example, an application 214 makes an initial request for the time epoch value (e.g., by checking /proc/sys/kernel/random/time_epoch as indicated at line 202), and then this initial time epoch value is stored by the application (e.g., in an application-controlled memory or to a file). At some later point in time, the application 214 makes a subsequent request for the current time epoch value (as indicated at line 205). If the current time epoch value is the same as the initial time epoch value, the application 214 may conclude that the system clock has not changed. However, if the current time epoch value is different from the initial time epoch value, then the application 214 may conclude that the system clock has changed in an unsafe manner, and the application 214 or UUID library 212 can take whatever measures it might deem necessary. This can include scanning the database for inconsistencies, controlling or limiting functionality in the event of a system clock setback event, or implementing measures to incorporate the system clock setback event.

The system clock setback detection mechanism described herein may be applied in combination with a UUID generator that generates type 1 UUIDs. According to the UUID standard, the clock sequence ID in a type 1 UUID must be incremented whenever the system clock is set backwards in time. With the system clock setback detection mechanism described herein, the UUID generator can know that the system clock has been set backwards in time since the last time a UUID was generated. But rather than using a counter-based identifier to track the system clock state (which cannot be maintained across reboots by the kernel), a random UUID value (e.g., a type 4 UUID) can be used to track the system clock state by generating a new random UUID value each time the system clock is set backwards.

To conserve system resources from being unnecessarily consumed to generate the random UUID during boot up, the time epoch module 222 may also be configured to generate a new time epoch value 232 upon detecting that an application (e.g., 214) is attempting to read the time epoch value 232 when a random UUID has not already been generated and stored as the time epoch value 232. This is equivalent to storing the random UUID value to the time epoch value 232 at boot up, but is more efficient insofar as no resources are wasted generating the time epoch value 232 if it is never consulted.

Figure 3:
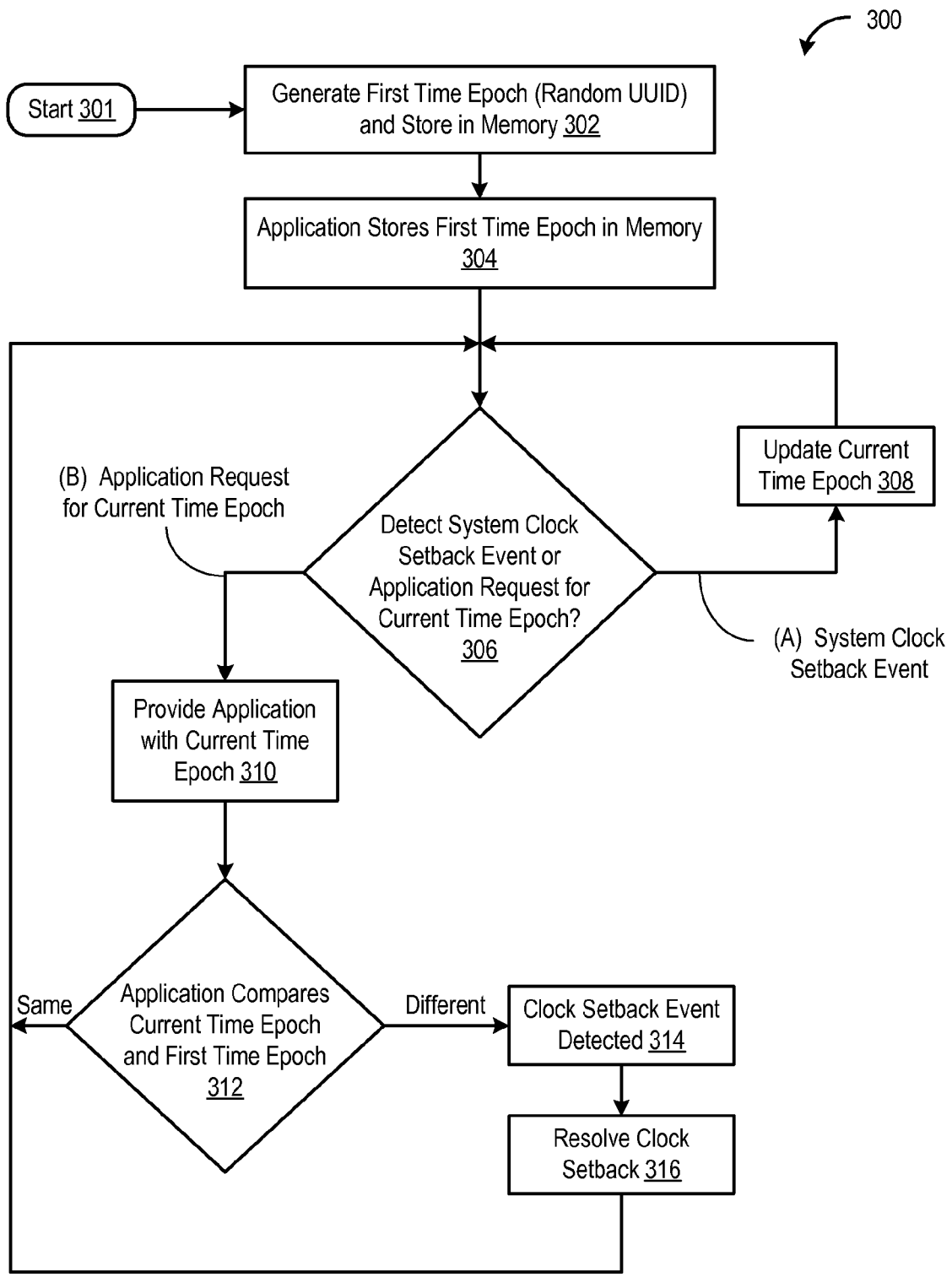
FIG. 3 is a logical flowchart of the steps used to detect a change in a system clock.

To illustrate how a random UUID may be used as a time epoch value to detect a change in a system clock, reference is now made to the process flow 300 depicted in FIG. 3. Starting at step 301, the system clock management process begins when a first time-based random number, such as a random UUID, is generated and stored as a first time epoch value in memory (step 302). As described herein, the first time epoch value can be generated at system boot up, or alternatively when an application requests access to the first time epoch value before it has been generated.

At some subsequent point, the first time epoch value is retrieved and stored by an application that needs to monitor the system clock for setback events (step 304). An example of such an application is a Type 1 UUID generator which generates a UUID from the network address, timestamp and clock sequence ID which is incremented whenever the system clock is set back. As will be appreciated, there are other user space libraries, utilities and/or applications that need to track the system clock for setback events, such as applications that use timestamps to calculate dependencies or to determined when a cache file should be refreshed.

At some later point in time, a system clock setback event is detected (decision block 306) by a detection functionality that is configured to monitor at least the system clock state for potential setback events. In addition, the detection functionality (decision block 306) may be configured to detect a request by an application for the current time epoch value, though it will be appreciated that this additional detection functionality may be provided as a separate detection step either before or after the system clock setback detection step. As described herein, the detection function may be implemented with a kernel-level detector which is activated to monitor any changes to the system clock settings which cause the system clock to be set to a new time that is less than the old (or current) time. When a system clock setback event is detected (as indicated by the (A) outcome of decision 306), a new or "current" time epoch value is generated (step 308) before the system clock management process returns to a detection wait state (306). Any desired command sequence can be used to generate the current time epoch value, though an example Linux-based implementation updates the time epoch value by commanding a UUID library to issue a new random UUID for storage as the updated time epoch value.

On the other hand, when an application request for the current time epoch value is detected (as indicated by the (B) outcome of decision 306), a copy of the current time epoch value is provided to the application (step 310). If the current time epoch value is the same as the first time epoch value that was previously stored by the application ("Same" outcome of decision 312), this is an indication that the system clock has not changed, and the system clock management process 300 returns to a detection wait state (306). However, if the current time epoch value is different from the initial time epoch value ("Different" outcome of decision 312), this is an indication that the system clock has been set back in time (step 314), in which case the clock setback situation is resolved with any required measures (step 316) before the system clock management process 300 returns to the detection wait state (306).

As seen from the foregoing, by using a randomly generated (type 4) UUID to provide a time epoch value indication of the system clock state, the system clock management process 300 is able to detect system clock setback events across boots (when the system clock could potentially get reset, such as when the clock backup battery dies), since at each boot, the time epoch value (formed from a random UUID) will be different.

As will be appreciated by one skilled in the art, the present invention has been described in the context of an exemplary fully functioning data processing system, but may be embodied in whole or in part as a method, system, or computer program product. Furthermore, the present invention may take the form of a computer program product or instructions on a computer readable medium having computer-usable program code embodied in the medium. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. In addition, the present invention may take the form of an entirely software embodiment (including firmware, resident software, micro-code, etc.), an entirely hardware embodiment, or an embodiment combining software and hardware aspects that may all generally be referred to herein as a "circuit," "module" or "system." For example, the functions of time epoch module may be implemented in software instructions or program code stored in the kernel layer of a data processing system.

The foregoing description has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification and example implementations provide a complete description of the manufacture and use of the composition of the invention. Since many embodiments of the invention can be made without departing from the spirit and scope of the invention, the invention resides in the claims hereinafter appended.

What is claimed is:

1. A method for determining whether a system clock in a data processing system has been set back, comprising:
   generating a first random number and storing the first random number as a time epoch value, where the first random number is generated at least in part from a random number generator;
   generating a second random number when the system clock is set back in time from a previous system clock setting and storing the second random number to update the time epoch value, where the second random number is generated at least in part from a random number generator; and
   checking the time epoch value over time to determine from a change in the time epoch value that the system clock has been set back in time.

2. The method of claim 1, where each of the first and second random numbers comprises a random UUID.

3. The method of claim 1, where each of the first and second random numbers comprises a type 4 UUID.

4. The method of claim 1, further comprising:
   providing a first copy of the time epoch value to a first application in response to a first request from the first application; and
   providing a second copy of the time epoch value to the first application in response to a subsequent second request from the first application so that the first application can compare the first and second copies of the time epoch value to determine whether the system clock is set back in time.

5. The method of claim 1, where the first random number is generated during boot up of the data processing system.

6. The method of claim 1, where the first random number is generated when an application first attempts to read the time epoch value if the first random number has not already been generated and stored.

7. The method of claim 1, further comprising incrementing a clock sequence ID portion of a type 1 UUID when the step of checking the time epoch value over time indicates that the time epoch value has changed over time.

8. A computer-usable storage medium embodying computer program code, the computer program code comprising computer executable instructions configured for determining whether a system clock in a data processing system has been set back by:

generating a first random number and storing the first random number as a time epoch value, where the first random number is generated at least in part from a random number generator;

generating a second random number when the system clock is set back in time from a previous system clock setting and storing the second random number to update the time epoch value, where the second random number is generated at least in part from a random number generator; and checking the time epoch value over time to determine from a change in the time epoch value that the system clock has been set back in time.

9. The computer-usable storage medium of claim 8, where each of the first and second random numbers comprises a random UUID.

10. The computer-usable storage medium of claim 8, where each of the first and second random numbers comprises a type 4 UUID.

11. The computer-usable storage medium of claim 8, wherein the computer program code farther comprises computer executable instructions configured for:

providing a first copy of the time epoch value to a first application in response to a first request from the first application; and providing a second copy of the time epoch value to the first application in response to a subsequent second request from the first application so that the first application can compare the first and second copies of the time epoch value to determine whether the system clock is set back in time.

12. The computer-usable storage medium of claim 8, where the first random number is generated during boot up of the data processing system.

13. The computer-usable storage medium of claim 8, where the first random number is generated when an application first attempts to read the time epoch value if the first random number has not already been generated and stored.

14. The computer-usable storage medium of claim 8, wherein the computer program code farther comprises computer executable instructions configured for incrementing a clock sequence ID portion of a type 1 UUID when the step of checking the time epoch value over time indicates that the time epoch value has changed over time.

15. A data processing system comprising:
a processor;
a data bus coupled to the processor; and
a computer-usable medium embodying computer program code, the computer-usable medium being coupled to the data bus, the computer program code comprising instructions executable by the processor and configured for determining whether a system clock in a data processing system has been set back by:

generating a first random number and storing the first random number as a time epoch value, where the first random number is generated at least in part from a random number generator;

generating a second random number when the system clock is set back in time from a previous system clock setting and storing the second random number to update the time epoch value, where the second random number is generated at least in part from a random number generator; and checking the time epoch value over time to determine from a change in the time epoch value that the system clock has been set back in time.

16. The data processing system of claim 15, where each of the first and second random numbers comprises a random UUID.

17. The data processing system of claim 15, wherein the computer program code further comprises computer executable instructions configured for:

providing a first copy of the time epoch value to a first application in response to a first request from the first application; and providing a second copy of the time epoch value to the first application in response to a subsequent second request from the first application so that the first application can compare the first and second copies of the time epoch value to determine whether the system clock is set back in time.

18. The data processing system of claim 15, where the first random number is generated during boot up of the data processing system or when an application first attempts to read the time epoch value if the first random number has not already been generated and stored.

19. The data processing system of claim 15, where the computer program code for generating the first and second random numbers comprises a time epoch module implemented in a kernel layer which serves as an interface between a hardware layer and an OS and applications layer.

20. The data processing system of claim 15, where the computer program code for checking the time epoch value over time comprises an application implemented in an OS and applications layer.

* * * * *